United States Patent [19]
Zardi

[11] Patent Number: 4,849,206
[45] Date of Patent: Jul. 18, 1989

[54] PROCESS TO OBTAIN AN OPTIMAL GAS DISTRIBUTION IN CATALYTIC BEDS FOR HETEROGENEOUS REACTIONS IN GASEOUS PHASE

[75] Inventor: Umberto Zardi, Breganzona, Switzerland

[73] Assignee: Ammonia Casale S.A., Switzerland

[21] Appl. No.: 25,600

[22] Filed: Mar. 13, 1987

[30] Foreign Application Priority Data

Mar. 13, 1986 [CH] Switzerland ............. 01025/86

[51] Int. Cl.$^4$ ............................................. C01C 1/04
[52] U.S. Cl. ........................................ 423/659; 422/148; 422/192; 423/361; 518/706
[58] Field of Search .................... 423/359, 361, 659; 422/148, 192; 518/706

[56] References Cited

U.S. PATENT DOCUMENTS 3,754,078  8/1973  Hinrichs et al. ............. 422/148
4,341,737  7/1982  Albano et al. ............... 422/192

FOREIGN PATENT DOCUMENTS 273054  11/1968  Austria .
1118750  9/1965  United Kingdom .
1352550  4/1971  United Kingdom .

Primary Examiner—John Doll
Assistant Examiner—Wayne A. Langel
Attorney, Agent, or Firm—Ostrolenk, Faber, Gerb & Soffen

[57] ABSTRACT

Process for obtaining an optimal synthesis gas distribution in catalytic beds for heterogeneous reactions in reactors comprising a cylindrical pressure vessel with an internal cartridge containing a catalyst.

4 Claims, 3 Drawing Sheets

PROCESS TO OBTAIN AN OPTIMAL GAS DISTRIBUTION IN CATALYTIC BEDS FOR HETEROGENEOUS REACTIONS IN GASEOUS PHASE

This invention refers to a system to obtain an optimal synthesis gas distribution in catalytic beds for heterogeneous reactions in reactors made up by a cylindrical pressure vessel with an internal cartridge with catalyst, in which at least two beds are found wherein the catalyst is placed, each bed presenting two cylindrical walls permeable to gas coaxial one to the other and with the axis of the pressure vessel, the gas passing through the catalytic beds with inward or outward radial flow or inward or outward axial-radial flow, and being distributed through gas inlet and outlet collectors.

The importance of the homogeneous distribution of the synthesis gas in catalytic beds for reactions in gaseous phases is well-known in order to obtain maximum catalyst utilization efficiency, and therefore, high reaction yields.

There are numerous patents that describe distribution systems of gas in catalytic beds, particularly in reactors with a radial type of gas flow.

PRIOR ART

Figure 1:
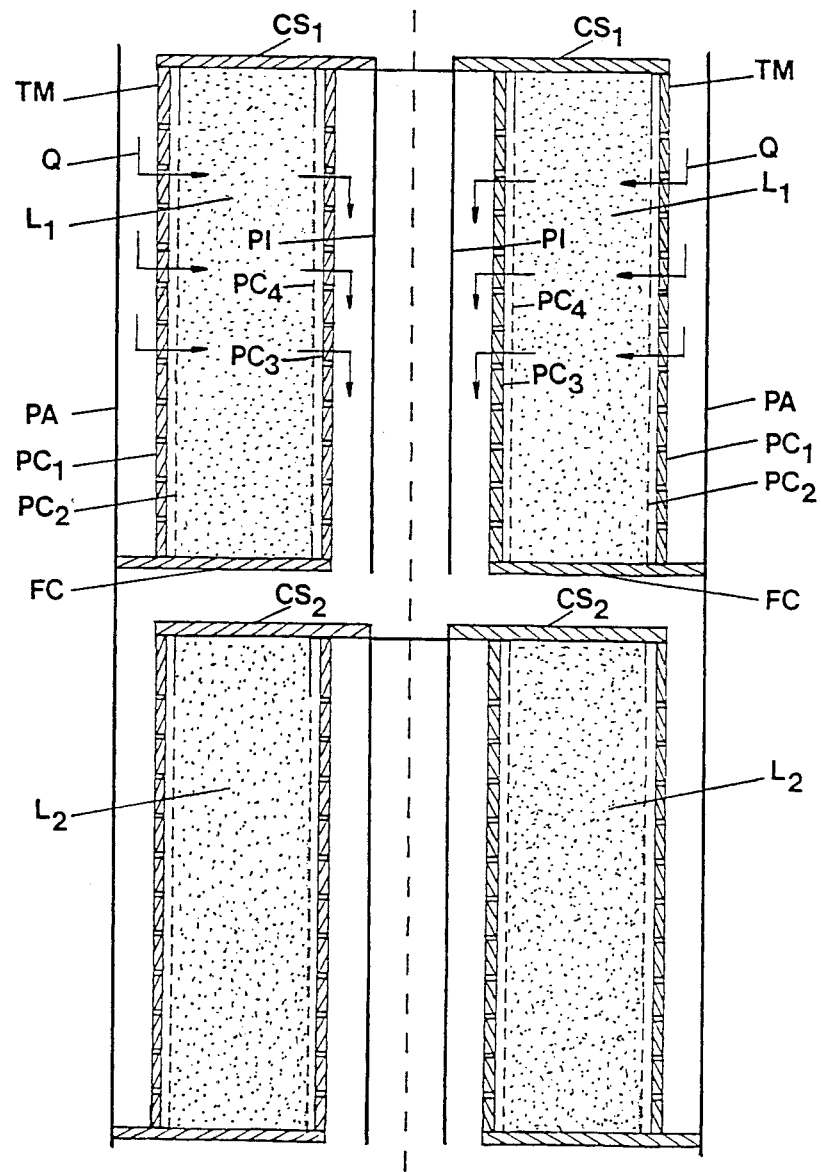

Reactors are known which are made up of a cylindrical pressure vessel with internal cartridge with catalyst placed in at least two beds, each bed presenting two cylindrical walls which are permeable to gas and coaxial one to the other and with the axis of the pressure vessel. The gas runs through said catalytic beds with inward or outward radial flow or inward or outward axial-radial flow, and is distributed through gas inlet and outlet collectors. Each collector is generally made up by either a central conduct coaxial with a pressure vessel whose wall is permeable to gas on the inner wall of the catalytic bed as represented in FIG. 1 of the English Pat. No. 1352550 (inlet collector with outward gas flow), or is made up by an airspace between a cylindrical wall permeable to gas and an unperforated solid wall (outlet collector of the gas as in FIG. 1 in the aforementioned English Pat. No. 1352550), or is made up by a double wall permeable to the gas, one of which with a larger surface area (37) with direct contact with catalytic bed or through a catalyst wire-net support as in FIG. 5 of the English Pat. No. 1118750), whereas the other wall (39) presents a cross section (40) for the gas which is notably lower than the first one, having the function to cause a concentrated pressure drop at least equal to that of the catalytic bed to favour a uniform gas distribution through the entire bed axial length.

In practice, the most widely used reactors adopt catalytic bed distributors as described above, the inlet collector of which is made by a double wall permeable to gas, an interior (37) closer to the catalytic bed as indicated in FIG. 5 of the English Pat. No. 1118750, and an exterior (39) with a smaller cross section for the gas passage in which a considerable pressure drop takes place (any times higher than that of the catalytic bed); hence special devices have to be adopted as f.i. indicated in claim No. 13 of the above mentioned Patent, in order to impart to the gas coming at a high velocity from the external distribution wall (the high velocity is a consequence of the reduced cross section of the external wall itself) a direction which runs parallel to the distributor walls, avoiding the direct impact with the permeable interior wall which could cause an uneven distribution of the gas in the bed and damage the catalyst.

In the above mentioned reactors the outlet collector generally does not present any concentrated pressure drop, being as explained already, the even gas distribution in the catalytic bed obtained through the pressure drop in the external wall of inlet collector.

With the above mentioned structure of the gas distribution collectors, a very efficient closure of the top head of the bed is generally required, which must show high mechanical strength to support the high pressure difference, in order to avoid that part of the gas by-passes the catalytic bed.

The object of the present invention is a system to obtain an optimal gas distribution in catalytic beds for synthesis reactions in gaseous phases, which permits a uniform gas distribution in the beds with high yields, avoiding the drawbacks of known systems particularly of those decribed above.

The system according to the invention is characterized by the fact that a set of distributors is provided: one gas inlet distributor in the catalytic beds and one distributor for gas outlet, each of which is formed by two cylindrical walls coaxial one to the other and with the axis of the cylindrical pressure vessel, and both walls of each distributor being permeable to gas; it is the wall of the mentioned distributors closer to the catalytic bed that has a higher cross section (more permeable to gas), whereas the other wall of each distributor shows: (a) a smaller cross section with respect to the wall nearest to the catalyst, even though still large enough to limit the pressure drop in the catalytic bed itself (in the gas inlet distributor); (b) a narrow cross section (low permeablitity) narrow enough to create a pressure drop almost two times (preferably at least four times the same) the pressure drop in the catalytic bed.

According to a feature of the invention, the system is applicable to reactors with gas flow in the radial or substantially radial catalytic beds (axial-radial beds according to U.S. Pat. No. 4372920 and No. 4405562) and is formed by a set of distributors, one which inlets the gas in the catalytic beds and one which outlets the gas, each distributor being made up of two cylindrical walls coaxial one to the other and with the axis of the cylindrical pressure vessel, and both walls being permeable to gas. It is the wall of the aforementioned distributors closest to the catalytic bed which contains the largest cross section (the most permeable to gas), whereas the other wall of each distributor presents: (a) a smaller cross section with respect to the wall nearest to the catalysor, although still large enough to limit the pressure drop through the same at least equal to that or three times inferior (perferably only one time inferior) to the pressure drop in the catalytic bed itself (in the gas inlet distributor); (b) a narrow cross section (low permeability) small enough to create a pressure drop almost the same but two times (preferably almost four times) the pressure drop in the catalytic bed (in the gas outlet distributor).

The different features and advantages of the invention are better understood on the basis of the following description which has an illustrative, but not limitative character, and which refers, for illustrative clarity, to the attached drawings no. 1, 2, and 3 that are partial and schematic distributor sections with longitudinal-axial planes.

In FIG. 1 a set of two annular beds L1 and L2 in series with the radial inward gas flow in bed Q is schematically represented, contained on the inside of the unperforated cylindrical wall PA, in that each bed is made up of: (a) a set of distributors, one in which the gas inlet is formed of two clyindrical walls coaxial one to the other, both walls being permeable to gas PC1 and PC2, PC2 being more permeable to the gas passage than PC1; one outlet made up of two cylindrical walls coaxial one to the other both walls being permeable to the gas PC3 and PC4, PC4 being more permeable to the gas passage than PC3; (b) a closed bottom FCp placed in the delimited space on the inside of wall PC1 of the inlet collector noted in point a) and a closed external wall PA; c) an upper cover CS which is placed in the delimited space in the interior of the wall PC1 of the inlet collector mentioned in point (a) and the unperforated cylindrical wall PI in the gas outlet conduct coming from the outlet collector under point (a).

The collector walls (PC1, PC2, PC3, and PC4) are not generally permeable to gas for a smaller cross section TM on their upper edge (closed zone of the cylindrical walls).

Figure 2:
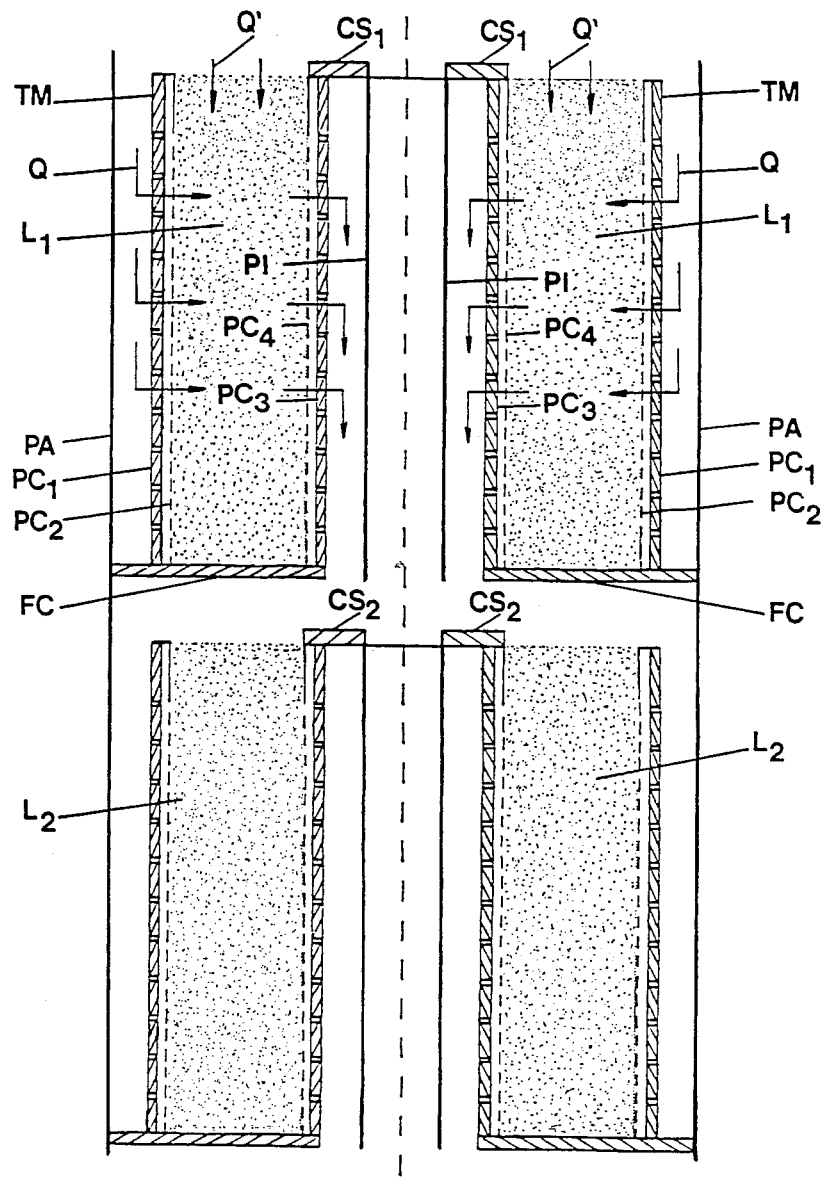

FIG. 2 schematically represents a set of two beds in which the largest amount of gas Q travels through the beds with radial-inward flow corresponding to the largest cross section permeable to gas in the collectors, and in which the remaining smaller cross section of the gas Q' goes through the beds with a substantial axial flow corresponding to the smaller cross section TM of the collectors unpermeable to gas, the above mentioned smaller cross section penetrating the catalytic bed of the upper open passage delimited by the two collectors, the upper cover CS not being present in the zone of the catalytic bed delimited by the internal walls of the two collectors, but being limited to the zone comprised between the internal wall PC4 of the gas outlet collector and the unperforated cylindrical wall PI.

Figure 3:
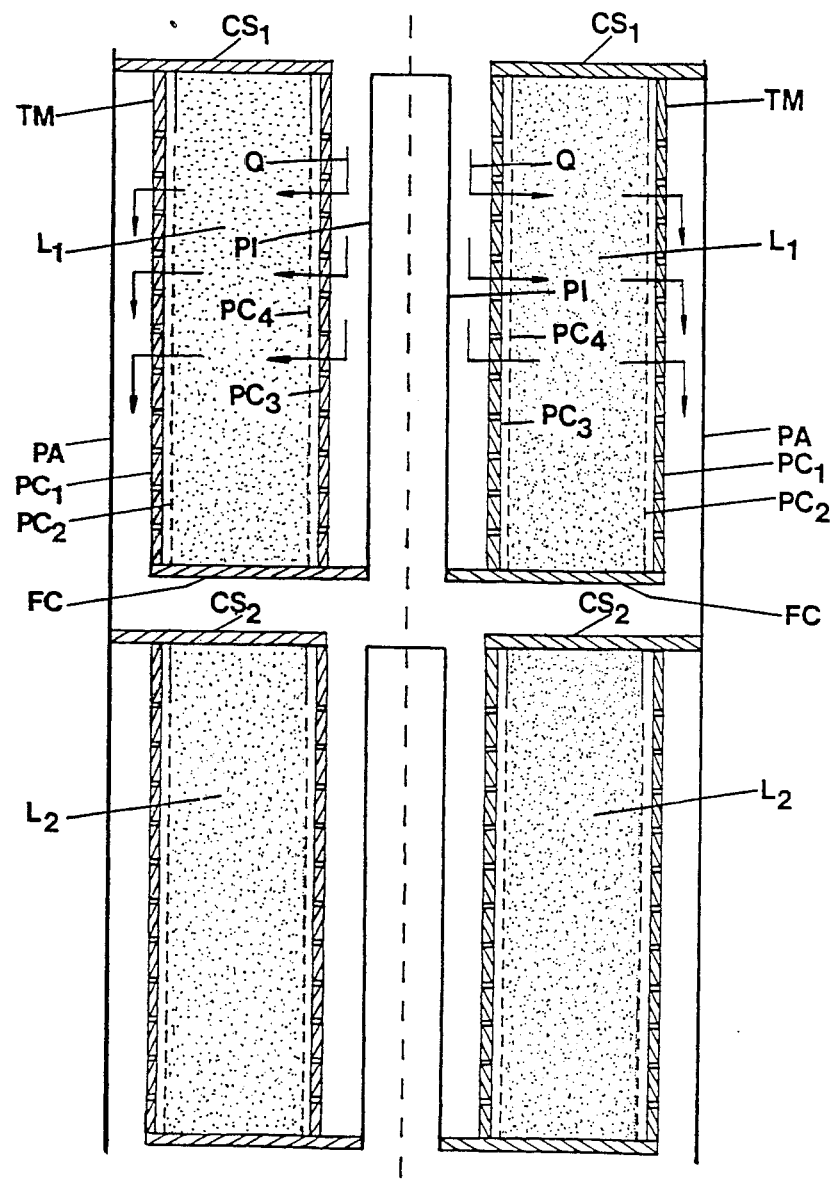

In FIG. 3 a system of catalytic beds, substantially as described in the preceeding figures is illustrated, but with radial-outward gas flow. In this case the function of the collectors is inverted (PC3 and PC4 being the inlet collector's walls and PC1 and PC2 those of the outlet collector) the closed bottom being delimited by the PC1 and PI walls and the upper cover CS being delimited by the walls PA and PC3.

EXAMPLES (I) In a ammonia synthesis reactor with two catalytic beds with radial-outward gas flow, carried out as described in FIG. 1, the following operative conditions have been foreseen:

1.1 Use of a suitable catalyst with irregularly sized granules. The dimension of the granules is 1. 5–3 mm;
1.2 Pressure drop of the gas in the catalytic bed 0.015 kg/cm$^2$
1.3 Pressure drop on the PC1 wall of the inlet collector 0.02 kg/cm$^2$ (pressure drop on the PC2 wall of the inlet collector is negligible).
1.4 Pressure drop on the PC3 wall of the outlet collector 0.05 kg/cm$^2$ (pressure drop on the PC4 wall is negligible).
1.5 Different pressure on the CS cover in the zone of the catalytic bed: negligible (no tightness is needed).

(II) In an ammonia synthesis reactor, as described in FIG. 2, with three catalytic beds with partially radialinward larger cross section gas flow and partially axial smaller cross section gas flow, the following operative conditions have been foreseen:

2.1 Use of a suitable catalyst with irregular sized granules. The dimension of the granules is 1. 5–3 mm;
2.2 Pressure drop of the gas in the catalytic bed 0.015 kg/cm$^2$;
2.3 Pressure drop of the PC1 wall of the inlet collector 0.02 kg/cm$^2$ (pressure drop of the PC2 wall of the inlet collector is negligible);
2.4 Pressure drop on the PC3 wall of the outlet collector 0.1 kg/cm$^2$ (pressure drop on the wall PC4 is negligible):
2.5 Upper bed is open.

SUMMARY

The system to obtain an optimal distribution of the synthesis gas in catalytic beds for heterogeneous reactions in gaseous phases is, according to the invention, formed by a set of gas distributors for each catalytic bed, one for the inlet of the gas in the catalytic beds and one for the outlet of the gas, each distributor being made up of two cylindrical walls coaxial one to the other and with the axis of the cylindrical pressure vessel, and both being permeable to gas. The wall of the distributors closest to the catalytic bed is the one with the largest cross section (more permeable to gas), whereas the other wall of each distributor presents: (a) a smaller cross section with respect to the wall nearer to the catalyst, but still large enough in order to limit the pressure drop through the same at least equal and not higher than three times (preferably not higher than one time) the pressure drop in the catalytic bed itself (in the gas inlet distributor); b) a narrow cross section (low permeability) narrow enough to create a pressure drop of at least (preferably at least four times) the pressure drop of the catalytic bed (in the outlet gas distributor).

I claim:

1. A process for obtaining an optimal distribution of synthesis gas in catalyst beds for heterogeneous reactions in converters consisting of a cylindrical pressure vessel with an internal cartridge in which at least two catalyst beds are located, comprising:
    flowing reaction gas in said catalyst beds in a substantially radial direction;
    maintaining a pressure drop across said catalyst bed and at inlet and outlet gas permeable distributing walls, at least one of said walls being a double wall comprising two gas permeable panels, one panel being located close to the catalyst bed and another panel being located further away from the catalyst bed, said panels being separated by a gas-filled interspace;
    said panel furthest from the catalyst bed having a gas flow through area and gas permeability lower than that of the panel closest to said catalyst bed;
    said panel furthest from the catalyst bed having a pressure drop which is greater than the pressure drop across the catalyst bed; and,
    said pressure drops being caused contemporaneously on both of said inlet and outlet gas permeable distributing walls to produce a higher pressure drop on one of said walls than on the other wall.

2. A process as claimed in claim 1, wherein the higher pressure drop occurs at said outlet gas permeable distributing wall.

3. A process as claimed in claim 1, wherein said pressure drop at said inlet gas permeable distributing wall is between one and three times said pressure drop across the catalytic bed, and said pressure drop at said outlet gas permeable distributing wall is at least twice said pressure drop across said catalyst bed.

4. A process as claimed in claim 3, wherein said pressure drop at said outlet gas permeable distributing wall is at least four times said pressure drop across said catalyst bed.

* * * * *